United States Patent
Sun (10) Patent No.: US 9,106,468 B1
(45) Date of Patent: Aug. 11, 2015

(54) TRANSFERRING MEDIA OBJECTS FROM ONE DEVICE TO ANOTHER DEVICE

(75) Inventor: Yaojun Sun, South Riding, VA (US)

(73) Assignee: Sprint Communications Company L.P., Overland Park, KS (US)

(*) Notice: Subject to any disclaimer, the term of this patent is extended or adjusted under 35 U.S.C. 154(b) by 831 days.

(21) Appl. No.: 12/363,702

(22) Filed: Jan. 30, 2009

(51) Int. Cl.
G06F 15/16 (2006.01)
H04L 29/06 (2006.01)
H04L 29/08 (2006.01)
H04L 29/14 (2006.01)

(52) U.S. Cl.
CPC .......... *H04L 29/06* (2013.01); *H04L 65/4084* (2013.01); *H04L 65/80* (2013.01); *H04L 67/14* (2013.01); *H04L 67/148* (2013.01); *H04L 67/26* (2013.01); *H04L 67/42* (2013.01); *H04L 69/329* (2013.01); *H04L 69/40* (2013.01)

(58) Field of Classification Search
CPC ......... H04L 29/06; H04L 67/14; H04L 69/40; H04L 67/148; H04L 67/26; H04L 69/329; H04L 65/4084; H04L 65/80
USPC ......... 709/203, 217, 231, 227; 455/3.05, 403, 455/436; 370/331; 725/25, 86, 90, 105
See application file for complete search history.

(56) References Cited

U.S. PATENT DOCUMENTS

| | | | |
|---|---|---|---|
| 5,925,102 A | 7/1999 | Eilert et al. | |
| 6,477,542 B1 | 11/2002 | Papaioannou | |
| 6,973,667 B2* | 12/2005 | Fritsch | 725/88 |
| 6,996,129 B2* | 2/2006 | Krause et al. | 370/487 |
| 7,064,657 B2* | 6/2006 | Becker et al. | 340/426.1 |
| 7,116,714 B2* | 10/2006 | Hannuksela | 375/240.12 |
| 7,139,813 B1* | 11/2006 | Wallenius | 709/219 |
| 7,191,233 B2* | 3/2007 | Miller | 709/227 |
| 7,206,559 B2* | 4/2007 | Meade, II | 455/151.1 |
| 7,804,856 B2* | 9/2010 | Krause et al. | 370/486 |
| 7,889,697 B2 | 2/2011 | Chen et al. | |
| 8,032,671 B1 | 10/2011 | Sun | |
| 8,086,091 B2 | 12/2011 | Sotomaru | |
| 2002/0083438 A1* | 6/2002 | So et al. | 725/31 |
| 2002/0118671 A1* | 8/2002 | Staples et al. | 370/352 |
| 2003/0128664 A1 | 7/2003 | Connor | |
| 2003/0152044 A1 | 8/2003 | Turner | |
| 2004/0176157 A1* | 9/2004 | Walker et al. | 463/16 |
| 2006/0015580 A1* | 1/2006 | Gabriel et al. | 709/219 |
| 2006/0089843 A1* | 4/2006 | Flather | 705/1 |
| 2006/0263048 A1* | 11/2006 | Sato et al. | 386/95 |
| 2007/0058534 A1 | 3/2007 | Shimonishi et al. | |
| 2008/0152322 A1* | 6/2008 | Onoda | 386/126 |
| 2008/0162666 A1 | 7/2008 | Ebihara et al. | |

(Continued)

OTHER PUBLICATIONS

Non Final OA mailed Feb. 16, 2011 in U.S. Appl. No. 12/977,171, 9 pp.

(Continued)

*Primary Examiner* — Mohammad A Siddiqi (57) ABSTRACT

Systems, methods, and computer-readable media for transferring a media object from a source device to a destination device, wherein a portion of the media object has been delivered to the source device. An indication to transfer a media object from the source device to the destination device is recognized. Delivery of the media object to the first device is discontinued. An indication to resume delivery of the media object is received from the destination device. Delivery of the media object is resumed such that the destination device receives the media object. Accordingly, the destination device can present the media object to a user.

18 Claims, 5 Drawing Sheets

(56) References Cited

U.S. PATENT DOCUMENTS

| | | | |
|---|---|---|---|
| 2008/0195664 A1* | 8/2008 | Maharajh et al. | 707/104.1 |
| 2008/0310439 A1 | 12/2008 | Gale et al. | |
| 2009/0103565 A1 | 4/2009 | Matsui | |
| 2010/0115568 A1* | 5/2010 | Gupta et al. | 725/106 |
| 2010/0121891 A1* | 5/2010 | Zampiello | 707/822 |
| 2011/0197057 A1* | 8/2011 | Koch | 713/150 |
| 2011/0239024 A1 | 9/2011 | Hsieh et al. | |

OTHER PUBLICATIONS

Office Action, mailed Mar. 31, 2010, in U.S. Appl. No. 12/114,534, 11 pages.

Notice of Allowance, mailed Sep. 9, 2010, in U.S. Appl. No. 12/114,534, 6 pages.

Notice of Allowance, mailed May 17, 2011, in U.S. Appl. No. 12,977,171, 6 pp.

Final OA, mailed Oct. 16, 2012, in U.S. Appl. No. 12/235,792, 41 pp.

Notice of Allowance, mailed Dec. 3, 2012, in U.S. Appl. No. 12/323,263, 25 pp.

1-Mo. OA, mailed Oct. 4, 2011, in U.S. Appl. No. 12/235,792, 13 pp.

Pre-Interview Communication, mailed Dec. 28, 2011, in U.S. Appl. No. 12/323,263, 13 pp.

Non Final OA mailed Mar. 12, 2012 in U.S. Appl. No. 12/235,792, 33 pp.

First Action Interview, Office Action Summary, mailed May 30, 2012, in U.S. Appl. No. 12/323,263, 11 pp.

Non-Final OA m. Sep. 12, 2013, in related case, U.S. Appl. No. 12/235,796, pp. 1-26.

Non-Final Office Action mailed Mar. 17, 2015 in U.S. Appl. No. 12/235,792, 34 pages.

Final Office Action dated Jun. 16, 2014 in U.S. Appl. No. 12,235,792, 27 pages.

* cited by examiner

TRANSFERRING MEDIA OBJECTS FROM ONE DEVICE TO ANOTHER DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In embodiments, one or more computer-readable media having computer-executable instructions embodied thereon that, when executed, perform a method for transferring a media object from a first device to a second device, wherein a portion of the media object has been delivered to the first device. The method includes recognizing an indication to transfer the media object from the first device to the second device. Delivery of the media object to the first device is discontinued. An indication to resume delivery of the media object is received from the second device. Delivery of the media object is resumed to the second device.

In other embodiments, one or more computer-readable media having computer-executable instructions embodied thereon that, when executed, perform a method for transferring a media object from a source device to a destination device, wherein a portion of the media object has been delivered to the source device and presented thereon prior to pausing the delivery and the presentation of the media object on the source device. An indication to resume delivery of the media object to the destination device is provided. A media session is established that is utilized for delivering another portion of the media object to the destination device. The destination device receives and presents the portion of the media object delivered thereto.

In still further embodiments, a set of computer-useable instructions provide a method for transferring a media object from a source device to a destination device, wherein a portion of the media object has been delivered to the source device. The method includes receiving from a source device a request to transfer the media object from the source device to the destination device. The request to transfer the media object includes an indication of the destination device to which the media source is to transfer. It is verified that the destination device is a device to which the media object can be transferred. Delivery of the media object to the source device is paused by communicating to a media server a request to pause delivery of the media object. A request to resume delivery of the media object is received from the destination device. Delivery of the media object to the destination device is resumed by communicating to the media server a request to resume delivery of the media object. The media object received from the media server is redirected to the destination device, and the destination device presents the media object to a user.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
    4G Fourth-Generation Wireless Telephone Technology
    CDMA Code Division Multiple Access
    CD-ROM Compact Disk Read Only Memory
    DAP Digital Audio Player
    DVD Digital Versatile Discs
    EEPROM Electrically Erasable Programmable Read Only Memory
    HTTP Hypertext Transfer Protocol
    GPRS General Packet Radio Service
    GSM Global System for Mobile Communications
    iDEN Integrated Digital Enhanced Network
    IP Internet Protocol
    ISP Internet Service Provider
    MP3 MPEG-1 Audio Layer 3
    MMS Microsoft Media Server
    PC Personal Computer
    PCS Personal Communications Service
    PDA Personal Digital Assistant
    PMP Portable Media Player
    PNM Progressive Networks Media
    PVP Portable Video Player
    RAM Random Access Memory
    ROM Read Only Memory
    RTMP Real Time Messaging Protocol
    RTSP Real Time Streaming Protocol
    RTSPT RTSP using TCP
    RTSPU RTSP using UDP
    TCP Transmission Control Protocol TDMA Time Division Multiple Access
UDP User Datagram Protocol
UMTS Universal Mobile Telecommunications System
WiMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for transferring media objects from one device to another device. A media object, as used herein, refers to any media content including, but not limited to, videos, songs, movies, games, and/or any other type of media content, or portions thereof. As such, a media object can be, for example, an audio media object, a video media object, a combination thereof, or the like.

Streaming services can be utilized to deliver media objects to a device, such as a mobile phone. A streaming service, as used herein, refers to a particular method used to deliver a media object from a media server to a device over a network, such as the Internet and/or a mobile data network. With streaming services, a media object begins playing upon the device receiving a small amount of media data (i.e. data associated with a media object). The media data received by the device can be stored in a buffer or memory. As such, in embodiments, the media data is not stored permanently in the device hardware. The device receives media data in advance of being output by the device.

Although a portion of a media object might be initially delivered via a streaming service to a device (e.g., a source device), a user might wish or desire to transfer the delivery and/or presentation of the media object to another device (e.g., a destination device). A user might wish to transfer a media object for any number of reasons, including, for example, to transfer a media object from an in-home device to a mobile device so that the user can leave the home, or a portion thereof, and continue viewing the media object. Conversely, a user might wish to transfer the media object from a mobile device to an in-home device when the user arrives home so that the user can have a better or different viewing experience (e.g., a better or larger presentation).

As previously set forth, embodiments of the present invention relate to systems, methods, and computer-readable media for transferring media objects from one device to another device. By way of example only, assume that a portion of a media object is delivered to a source device via streaming services and, as such, the device begins to present the media object. Further assume that a user wishes to transfer the delivery and/or presentation of the media object to another device, for example, from one mobile device to another mobile device. Accordingly, the user selects to transfer the media object via the initial device. Embodiments of the present invention enable the delivery and/or presentation of the media object to transfer to a desired destination device at substantially the same position at a later instance as though no interruption occurred. That is, upon an indication to transfer a media object, the media object can be presented on a destination device at the point it was interrupted when the transfer was initiated. As such, a user can transfer a delivery and/or presentation of a media object without having to restart the media object from the beginning.

Figure 1:
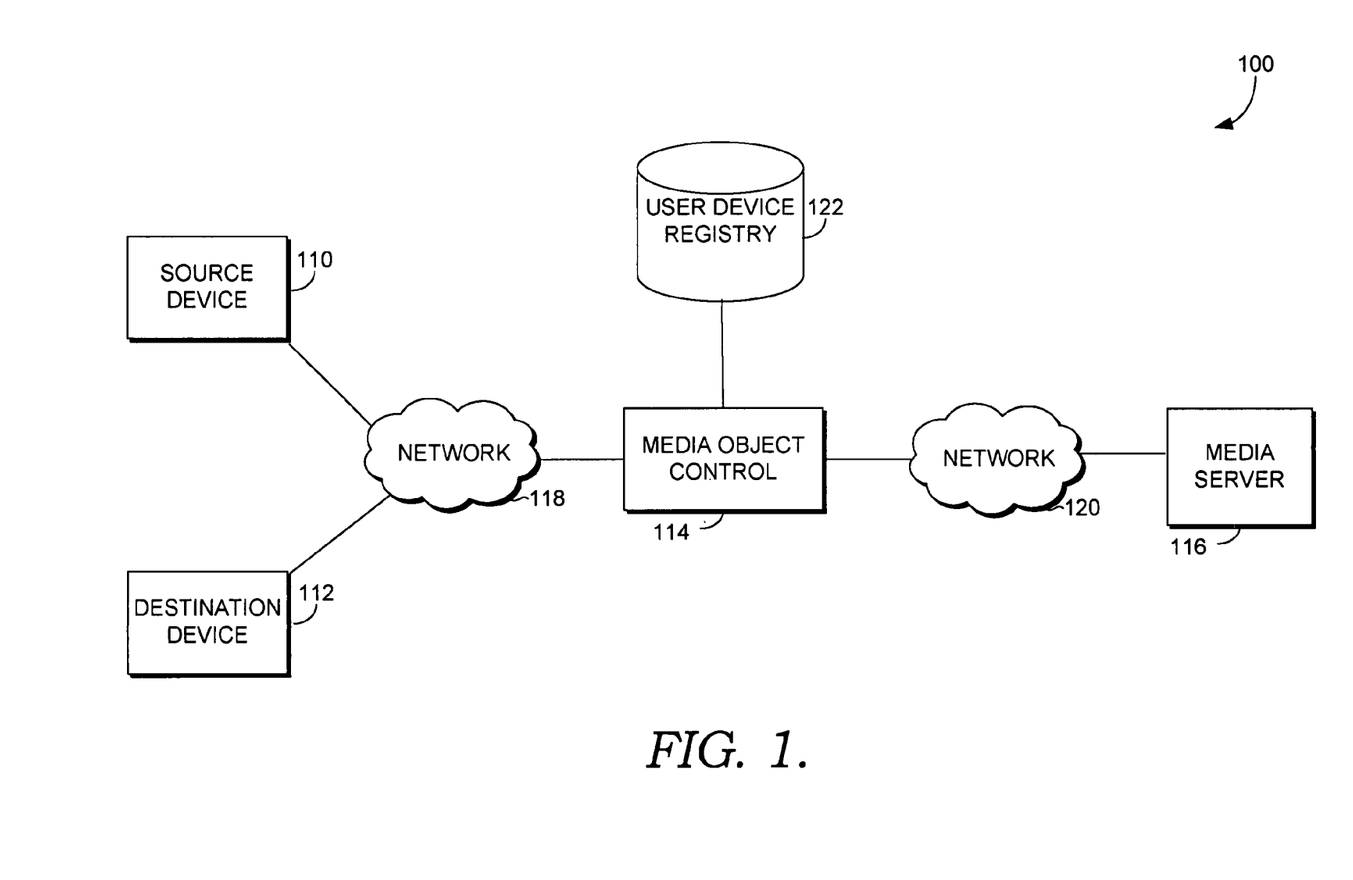
FIG. 1 is a block diagram of an exemplary computing system for transferring media objects, in accordance with an embodiment of the present invention.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form.

As shown in FIG. 1, an exemplary computing system 100 includes a source device 110, a destination device 112, a media object control 114, and a media server 116. Source device 110, destination device 112, media object control 114, and media server 116 are capable of communicating via a communications network(s), such as network 118 and/or network 120. Network 118 and/or network 120 might comprise, for example, a cable network, the Internet, a wireless network (e.g., a wireless telecommunications network), or a combination thereof or portions thereof. A wireless telecommunications network refers to any type of telecommunications network that is wireless. Examples of a wireless telecommunications technologies that are compatible with the networks 118 and/or 120 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS).

In embodiments, network 118 and/or network 120 include an array of devices, which are not shown so as to not obscure more relevant aspects of the invention. Components such as a base station, a communications tower, or even access points (as well as other components) can provide wireless connectivity in some embodiments. Communications network 118 and network 120 may be combined into a single network or can include multiple networks, as well as being a network of networks, but is shown in more simple form so as to not obscure other aspects of the present invention. In this regard, although FIG. 1 illustrates source device 110 and destination device 112 communicating with the media object control 114 via a single network 118, multiple networks can be used. For instance, the source device 110 might be associated with a 3G network (i.e., a 3G source device) while the destination device 112 might be associated with a 4G network (i.e., a 4G destination device). In such a case, the 3G source device communicates with the media object control 114 via a 3G mobile data network and the 4G destination device communicates with the media object control 114 via a 4G mobile data network.

Network 118 enables communication between source device 110, destination device 112, and media object control 114. In one embodiment, network 118 comprises a wireless telecommunications network provided by a telecommunications network provider, such as, for example, Sprint®, AT&T®, etc. In another embodiment, network 118 comprises the Internet. In such a case, a device, such as a landline computing device, can communicate with the media object control 114 via an ISP (Internet Service Provider) associated with the Internet. Network 120 enables communication between media object control 114 and media server 116. In one embodiment, network 120 comprises a wireless network or a physically wired network, such as a landline, Ethernet, or the like. Such a physically wired network utilized for communication between the media object control 114 and the media server 116 reduces the likelihood of physical disconnections and other data loss events between the media server 116 and the media object control 114, thereby, enhancing user experience. As the media server 116 can be an Internet media server that provides media objects via the Internet, network 120 might comprise the Internet. Alternatively, as the media server 116 can be an operator streaming server, network 120 might comprise a telecommunications network (e.g., a wireless telecommunications network) hosted by a telecommunications network provider. In such an embodiment, network 118 and network 120 can be provided by the same telecommunications network provider or different telecommunications network providers.

Communications between components (e.g., devices, media object controls, and media servers) can be provided using any protocol, such as, for example, RTSP, HTTP, and/or any streaming protocol. In one embodiment, a protocol such as RTSP and/or HTTP might be utilized. RTSP might include the user of TCP (i.e., RTSPT) and/or UDP (i.e., RTSPU). In another embodiment, another streaming protocol might be utilized for communications, such as RTMP, PNM, MMS, or the like. By way of example only, communications between the source device 110, the destination device 112, and the media object control 114 might use a streaming protocol, for example, associated with CDMA, WiMAX, a landline, or an IP connection, while communications between media object control 114 and the media server 116 might use RTSP and/or HTTP. Although single components are illustrated for clarity, network 118 can enable communication between multiple devices and/or multiple media object controls, and network 120 can enable communication between multiple media object controls and/or multiple media servers.

The source device 110 is utilized to initially request media objects and present the requested media objects to a user. As used herein, the phrase "device" refers to any electronic device capable of presenting media objects. As such, source device 110 may take on a variety of forms, such as a personal computer (PC), a laptop computer, a mobile phone, a personal digital assistant (PDA), a portable media player (PMP), a television (TV), or any other device that is capable of presenting media objects as described herein. A portable media player (PMP) device may include, without limitation, a portable video player (PVP) and/or a digital audio player (DAP), such as a MP3 player. Accordingly, a source device 110 that is capable of presenting media objects may be variously referred to herein as a device, a client device, a media device, a portable media device, a portable media player, a media player, or the like. Makers of illustrative devices include, for example, Research in Motion, Creative Technologies Corp., Samsung, Apple Computer, and the like. A source device can include, for example, a display(s), a power source(s) (e.g., a battery), a data store(s), a speaker(s), memory, a buffer(s), and the like. In embodiments, a source device comprises a wireless or mobile source device with which a wireless telecommunications network is utilized for communication. In other embodiments, a source device comprises a mobile or stationary source device (e.g., a landline laptop) with which a network, such as the Internet and/or landline, is utilized for communication.

The source device 110 initiates a delivery, reception, and/or presentation of a media object. In this regard, the source device 110 can initiate a media session to receive and/or present a media object by requesting that the media object be delivered via a streaming service. A media session, as used herein, refers to a period of time measured from one point (e.g., beginning) to another point (e.g., end) of a streaming service being provided to a device or devices. That is, a media session might begin with a source device initiating a streaming service so that the source device receives and presents a media object, and such a media session might end when a source device, a destination device, a media object control, and/or a media server are disconnected from one another upon completing or ending the transmission of the media object to the source device or destination device. It can be appreciated that a media session can begin and end at various points. For example, in some embodiments, a media session might begin upon communicating a media request, upon establishing a media session, upon generating a media session identifier, upon a media object control or media server communicating a media response, upon a source device receiving a media response, or the like.

By way of example only, the source device 110 might generate and/or communicate a media request. A media request refers to a data packet that includes a request for a media object, for example, to be delivered, received, and/or presented. In one embodiment, such a media request might be communicated to the media object control 114 via network 118. For example, in instances where the source device 110 comprises a mobile device, a media request is communicated to the media object control 114 via a mobile data network (e.g., a 3G or 4G mobile data network). On the other hand, in instances where the source device 110 comprises a stationary device, a media request might be communicated via a landline (e.g., cable network).

In one implementation, the media request might include a streaming service instruction and a media object identifier to identify the media object desired to be delivered, received, and/or presented. A streaming service instruction provides an indication of initiation of a streaming service. A media object identifier refers to any identifier that identifies a particular media object. Such a media object identifier can be utilized to reference or obtain the desired media object. A media object identifier may comprise, for example, a number, a title, a container label, an icon, an artist, a symbol, an image, a link, or any other feature that can identify a media object. A media request might include, in some embodiments, a media session identifier. A media session identifier refers to any identifier (e.g., a number, text, combination thereof, or the like) that uniquely identifies a particular media session associated with the media object, source device, or the like. A media session identifier enables appropriate communication between devices, media object controls, and/or media servers. Such a media session identifier, might be generated at any time or by any component. For example, a media session identifier might be created by a source device for utilization in initiating delivery of a media object, by a media object control, or by a media server upon receiving a media request, a pause request, a transfer request, or the like.

In embodiments, the source device 110 might be configured to initiate delivery, reception, and/or presentation of a media object upon detecting an indication to initiate the media object. In one embodiment, an indication to initiate a delivery, presentation, or reception of a media object is provided by a user. In such an embodiment, a user may navigate to a desired media object identifier. Upon navigating to the desired media object identifier, the user can provide an indication to initiate the presentation and/or reception of the media object. For example, a user can navigate to "Video 1" and provide an indication to play "Video 1." A user-provided indication to initiate a presentation, delivery, and/or reception of a media object might include a user's selection of a media object identifier associated with the media object desired for presentation. In such a case, a user can select a media object identifier by, for example, double-clicking on a media object identifier, right-clicking on a media object identifier, hovering over a media object identifier, dragging and dropping a media object identifier, providing an audio command, selecting a media object identifier via a touch screen, or the like.

The source device 110 might be configured to detect an indication to initiate a media object upon attaining a certain threshold and/or parameter. For example, assume that hovering over a media identifier provides an indication to initiate the presentation of a media object. In such a case, the source device 110 can detect the indication after a media object identifier is hovered over, for example, for two seconds. Such thresholds and parameters might provide a more user-friendly user interface.

In an alternative embodiment, an indication to initiate a media object may be automatically provided. In such an embodiment, an indication to initiate a media object may be automatically provided based on the occurrence of an event. Such an event may include, for example, initiating a media player or a media browser, navigating to a website, or the like.

The source device 110 receives communications, for example, from the media object control 114, the media server 116, or a combination thereof. Such communications include, for example, media responses and media data. A media response, as used herein, refers to a packet communicated in response to a media request that indicates a receipt or confirmation of the media request. In embodiments, a media response might include a media session identifier (e.g., a media session identifier generated by a device, a media object control, or a media server). Such a media session identifier might be established via a media server or a media object control. A media session identifier refers to any identifier (e.g., a number, text, a combination thereof, or the like) that uniquely identifies a media session associated with a media object. A media session identifier might be established and/or communicated independent from a media request, media response, transfer request, pause request, or media data. Such a media response might establish a media session between a source device and a media object control and/or a media server. Media data, as used herein, refers to any data associated with a media object, or a portion thereof, including, for example, media content, information associated with media content or the delivery thereof, etc. Media data can be communicated via a media packet that includes, for example, a header and media content (e.g., one or more frames). The media data enables the presentation of a media object on a device. In embodiments, the media data received by a device might be stored (e.g., temporarily or momentarily) in a buffer or memory of the source device 110.

The source device 110 presents or outputs (e.g. audio or video playback) the media object, or portions thereof. In some embodiments, the source device 110 utilizes a display screen associated with (e.g., coupled with) the source device, an audio system associated with the source device, or a combination thereof. The media object might be presented as the media data is received or upon the device receiving a particular amount of media data buffered on the device.

The source device 110 initiates a transfer of a media object, or media session associated therewith. That is, the source device 110 initiates the transfer of a media object to another device by requesting such a media object, or media session associated therewith, be transferred. By way of example, the source device 110 might generate and/or communicate a transfer request. A transfer request refers to a data packet that includes a request for a transfer of media object, or a media session associated therewith. In one embodiment, such a transfer request is communicated to the media object control 114 via network 118. For example, in instances where the source device 110 comprises a mobile device, a transfer request is communicated to the media object control 114 via a mobile data network (e.g., a 3G or 4G mobile data network). On the other hand, in instances where the source device 110 comprises a stationary device, a transfer request is communicated via a landline (e.g., cable network).

In one implementation, a transfer request might include, without limitation, a transfer instruction, a media object identifier to identify the media object desired to be transferred, a media session identifier to identify the streaming session desired to be transferred, an indication of a source device (e.g., a source device identifier), and/or an indication of a destination device (e.g., a destination device identifier). A transfer instruction provides an indication of initiate a transfer. A media object identifier refers to any identifier that identifies a particular media object. Such a media object identifier can be utilized to, among other things, identify a particular media object desired to be transferred. A source device identifier refers to any identifier that identifies a particular source device from which the media object and/or media session is transferred. A destination device identifier refers to any identifier that identifies a particular destination device to which the media object and/or media session is to be transferred.

In embodiments, the source device 110 might be configured to initiate a transfer upon detecting an indication to initiate the transfer of a media object (e.g., transfer indication). In one embodiment, an indication to initiate a transfer of a media object is provided by a user via a user interface. In such an embodiment, a user may navigate to a desired identifier (e.g., media object identifier, media session identifier, destination device identifier, etc.). Upon navigating to a desired identifier, a user can provide an indication to initiate the transfer of the media object. For example, a user can navigate to "Video 1" and provide an indication to transfer "Video 1" that represents a media object or a media session associated therewith to another device (e.g., a device might be selected by a user via a user interface). Additionally or alternatively, a user can navigate to "destination device 1" and provide an indication to transfer a particular media object or media session to the destination device. A user-provided indication to initiate a transfer of a media object might include a user's selection of an identifier associated with the media object desired to be transferred. In such a case, a user can select an identifier by, for example, double-clicking on an identifier, right-clicking on a media object identifier, hovering over a media object identifier, dragging and dropping a media object identifier, providing an audio command, selecting an identifier via a touch screen, or the like.

In an alternative embodiment, an indication to initiate a transfer of a media object may be automatically provided. In such an embodiment, an indication to initiate the transfer of a media object may be automatically provided based on the occurrence of an event. Such an event may include, for example, initiating a media player or a media browser, navigating to a website, or the like.

The source device 110 disconnects or initiates a disconnection of the source device 110 from the media object control 114 and/or the media server 116. Such a disconnection refers to ending or closing a media session, a delivery of a media object, or a connection between components. To disconnect the source device 110, the source device 110 might generate and/or communicate a disconnection packet that indicates a disconnection or a request to end a media session. In some cases, a disconnection packet might be generated and communicated upon detecting a user indication that indicates a desire to transfer or end a media object or media session. For example, in instances where a user interface is provided to a user to transfer a media object, rather than selecting to transfer the media object, a user might select to discontinue the reception of media data. Alternatively, in some cases, a disconnection packet might be generated and communicated automatically upon the occurrence of an event, such as reception of a last packet associated with a media object or a media session, or a lapse of a time or time period (e.g., a disconnection occurs upon expiration of a specific amount of time between a transfer request of one device and a resume request of another device). For example, assume a source device 110 is configured to disconnect after the device has been paused for twenty-four hours. In such a case, upon the lapse of the twenty-four hour period, a disconnection packet might be automatically (i.e., without user intervention) generated and communicated to the media object control 114. In one embodiment, disconnection or initiating a disconnection can occur in association with a transfer request. In this regard, the transfer request might provide an indication to end a delivery of a media object.

Functions performed by the source device might be performed via a client plug-in installed on the source device. A client plug-in might be used on a device to access the media object control 114 for transferring a media object, or a media session associated therewith, to another device. In such a case, the client plug-in might direct communications to the media object control 114 (e.g., via an IP address).

The media object control 114 is configured to communicate with source device 110, destination device 112, and media server 116 via networks 118 and/or 120. Any number of media object controls can be used to communicate with source devices, destination devices, and media servers. For example, a single media object control can provide support for single or multiple source devices, destination devices, media servers, or a combination thereof. Alternatively, multiple media object controls can provide support for single or multiple source devices, destination devices, media servers, or a combination thereof. In embodiments, the media object control 114 enables the transfer of a media object or a media session associated therewith. Such a media object control 114 that enables the transferring of media objects, as more fully described below, provides an enhanced user experience.

The media object control 114 recognizes an indication to provide a media object to a source device (e.g., a media request). In embodiments, the media object control 114 receives a media request from a source device. The received media request is communicated to a media server, such as media server 116. For example, upon a source device receiving a user indication to receive, deliver, and/or present a media object, the source device might generate a media request to be communicated to the media object control 114. Upon receiving a media request, the media object control 114 communicates (e.g., forwards) the media request, or a corresponding media request, to an appropriate media server. In embodiments, the media object control 114 might be configured to identify an appropriate media server to which to direct the media request, cache the media request, and/or modify the media request (e.g., alter the packet header).

Upon the media object control 114 communicating a media request, the media object control 114 might receive a media response from the media server. The received media response is communicated to a source device, such as source device 110. By way of example, the media object control 114 receives a media response, for example, communicated from the media server 116, as discussed more fully below. Upon receiving a media response, the media object control 114 communicates (e.g., forwards) the media response, or a corresponding media response, to an appropriate source device. In embodiments, the media object control 114 might be configured to identify an appropriate source device to which to direct the media response, cache the media response, and/or modify the media response (e.g., alter the packet header). The media response might, in some embodiments, contain a media session identifier created by a media object control, a media server, or a source device.

The media object control 114 obtains media objects, or media data associated therewith, provided by a media server, such as media server 116. In embodiments, the media object control 114 receives media data transmitted from a media server and/or communicates the received media data to an appropriate source device. In some implementations, media data directed to a source device might refer to a copy of the media data, the original media data, or information associated therewith. For example, in one embodiment, a copy of the received media data might be generated and directed to an appropriate storage queue within the media object control 114 and, thereafter, the media data received by the media object control 114 might be forwarded on to the appropriate source device.

The media object control 114 initiates a pause of delivery of a media object from a media server, such as the media server 116. In some implementations, pausing delivery is initiated upon recognizing an indication to transfer a media object, or a media session associated therewith (e.g., a transfer request). In this regard, the media object control 114 receives, for example, a transfer request communicated from a source device, such as the source device 110. Upon receiving the transfer request, the media object control 114 provides an indication to pause delivery of a media object. An indication to pause delivery of a media object might be a pause request. That is, the media object control 114 might, in one embodiment, generate and/or communicate a pause request to a media server delivering media data. A pause request refers to a request (e.g., a data packet) that includes an indication to pause delivery of a media object. Such a pause request might provide an indication to the media server 116 to pause the delivery of media data to the media object control 114. In embodiments, a pause request might be a transfer request received by a media object control 114, or a modified transfer request that is communicated (e.g., forwarded) to an appropriate media server. Alternatively, a pause request might be a request generated by the media object control 114. The media object control 114 might be configured to identify an appropriate media server to which to direct a pause request, cache a pause or transfer request, and/or modify a transfer request to attain a pause request (e.g., alter the packet header). The media object control 114 might receive a pause response from the media server 116 that is communicated from the media server in response to the pause request.

In addition, the media object control 114 might verify the source device, destination device, or the appropriateness of a media object (or media session) transfer. That is, the media object control 114 might verify that a source device and/or destination device is registered with a media object control, or service provider associated therewith (e.g., a wireless telecommunications network). Such a verification might occur at any time, such as, for example, prior to communicating a pause request, upon receiving a transfer request, or the like. In embodiments, the user device registry 122 might be used to perform a verification. The user device registry 122 is a data store that stores data, for example, in association with source devices, destination devices, users associated therewith, or the like. For example, the user device registry 122 might include source device identifiers, destination device identifiers, accessing methods, and client capabilities. The user device registry 122 might obtain such information from a user that might be required to set up or register devices for transferring media objects. The user provided information can then be stored in the user device registry 122 and accessed by, for example, a media object control for verification purposes. Although the user device registry 122 is illustrated in FIG. 1 as a component remote from the media object control 114, such a user device registry can be integrated with the media object control 114 or another component.

In some implementations, the media object control 114 creates a media session identifier in association with the source device that communicated the transfer request. Such a media session identifier can be used to assist with the transfer of a media object or media session associated therewith. Generating a media session identifier might be performed, for example, upon receiving a media request or a transfer request from a source device, among other times. One can appreciate that a media session identifier can be generated by any component such as a source device, media object control, or a media server. Such a media session identifier can be used to establish a media session, for example, between a source device, a media object control, and/or a media server.

The media object control 114 is used to resume delivery of a media object from a media server, such as the media server 116. In some implementations, the media object control 114 is used to resume delivery upon recognizing an indication to resume a media object, or a media session associated therewith (e.g., a resume request). In this regard, the media object control 114 might receive, for example, a resume request communicated from a destination device, such as destination device 112. Upon receiving a resume request, the media object control 114 communicates (e.g., forwards) the resume request, or a corresponding resume request, to an appropriate media server. In embodiments, the media object control 114 might be configured to identify an appropriate media server to which to direct the resume request, cache the resume request, and/or modify the resume request (e.g., alter the packet header). The media object control 114 is configured to resume or initiate a resume of delivering a media object at substantially the same point the media object was interrupted as though no interruption occurred (e.g., without restarting the media object at the beginning). In one embodiment, the media object control 114 receives a resume request transmitted by a destination device that requests resumption of a presentation, reception, or delivery of a media object.

The media object control 114 establishes a media session with a destination device, such as destination device 112. In embodiments, the media object control 114 establishes a media session with the destination device upon receiving a resume request. Establishing a media session with a destination device enables the resumption of the same media object, or media session associated therewith, previously delivered, in part, to a source device. To establish a media session with a destination device, a media object control can communicate a media session identifier. Such a media session identifier might be the media session identifier used in association with the source device and might be stored in the media object control, a source device, and/or a media server. Alternatively, in one implementation, the media session established with a destination device might be a distinct and separate media session from a media session established with a source device. In such a case, the media object control might associate the media sessions such that a proper transfer of a media object can occur.

Upon communicating a resume request to a media server, the media object control 114 receives the resumed media object, or media data associated therewith, from the media server. As such, the media object control 114 reroutes the resumed media object to the appropriate destination device, such as destination device 112. In embodiments, the media object control 114 transmits the resumed media object to the destination device in accordance with the newly established media session, the transfer request (e.g., destination device identifier), or the like.

The media object control 114 might discontinue the media session with the source device. Such a discontinuation of a media session can happen at any time including, for example, before, simultaneously as, or after a media session is established with the destination device. In one embodiment, a media session in association with a source device is discontinued automatically upon an establishment of a media session in association with a destination device.

The media object control 114 disconnects or initiates a disconnection from a media server, such as media server 116, the source device 110, and/or the destination device 112. To disconnect a media server, the media object control 114 might generate and/or communicate a disconnection packet that indicates a disconnection or a request to disconnect from another component. In some cases, a disconnection packet might be generated and/or communicated upon detecting an indication to end a media session, upon establishing a media session with a destination device, or upon detecting the last packet arrival at the media object control to end the media session. For example, in instances where a user interface is provided to a user to enable the resumption of a media object, rather than selecting to resume the media object, a user might select to discontinue the reception of media data. In such a case, a disconnection packet might be communicated upon the media object control 114 receiving an indication to discontinue a media session. Alternatively, in some cases, a disconnection packet might be generated and communicated upon the occurrence of an event, such as reception of a last packet associated with a media object or a lapse of a time or time period (e.g., a disconnection occurred for a specific amount of time). For example, assume a device is configured to disconnect after the device has been paused for twenty-four hours. In such a case, upon the lapse of the twenty-four hour period, a disconnection packet might be generated and communicated to the media object control 114.

The media server 116 is configured to communicate media objects, or media data associated therewith. A media server, as used herein, refers to a server or other computing device that provides or delivers media objects. In embodiments, a media server stores media objects or accesses media objects stored remotely. In such a case, media objects are available to be transmitted in accordance with a user's request or an automatically generated request. A media server might be an operator streaming server or an Internet streaming server. An operator streaming server refers to a media server hosted by a telecommunications network provider, such as, for example, Sprint® or AT&T®, that utilizes the telecommunications network of the host or other telecommunications network(s) to deliver media. An Internet streaming server is a media server that utilizes the Internet to deliver media. Such an Internet streaming server might be hosted by any entity.

The media server 116 can provide a media object, or media data associated therewith, in response to a media request. In embodiments, the media server 116 might reference, extract, or retrieve media data associated with the media object requested. Such media data might be stored in a data store residing within the media server 116 or remote from the media server 116. The media server 116 communicates the media data to a media object control.

The media server 116 pauses delivery of a media object, or media data associated therewith. In embodiments, the media server 116 automatically pauses delivery of a media object or media data in response to receiving a pause request from a media object control. By way of example only, upon receiving a pause request from a media object control, the media server 116 automatically pauses delivery of a media object to the media object control. In instances where the media server receives a pause request, upon receiving a pause request, the media server 116 communicates a pause response to an appropriate media object control. The media server 116 might be configured to identify an appropriate media object control to which to direct a pause response.

The media server 116 resumes delivery of a media object. Accordingly, delivery of a media object can resume at substantially the same point the media object was interrupted as though no interruption occurred (e.g., without restarting the media object at the beginning). In embodiments, the media server 116 receives a resume request transmitted by a media object control that requests resumption of delivering a media object. Such a resume request might include an indication (e.g., a resume indicator) of the last packet received or presented by the source device, the next packet for the media server 116 to send, or the like, so that the media server can identify a packet at which to begin transmitting to the media object control. By way of example only, upon receiving a resume request to resume delivery of media data, the media server 116 can resume the transmission of media data associated with a media object. As such, the media server 116 can begin transmitting media data in accordance with the media packet identifier that matches the resume indicator indicated in the media resume request.

The media server 116 might disconnect or initiate a disconnection from the media object control 114, the source device 110, and/or the destination device 112. To disconnect a media server, the media server 116 might generate and/or communicate a disconnection packet that indicates a disconnection or a request to disconnect from another component. In some cases, a disconnection packet might be generated and/or communicated upon detecting an indication to end a media session or upon detecting communication of the last packet of the media object. For example, in instances where a user interface is provided to a user to enable the resumption of a media object, rather than selecting to resume the media object, a user might select to discontinue the reception of media data. In such a case, a disconnection packet might be communicated upon the media server 116 receiving an indication to discontinue a media session.

Alternatively, in some cases, a disconnection packet might be generated and communicated upon the occurrence of an event, such as communication of a last packet associated with a media object or a lapse of a time or time period (e.g., a disconnection occurred for a specific amount of time). For example, assume a media server 116 has transmitted the final media data corresponding with a particular media object or a media request. In such a case, upon the transmission of the final media data, a disconnection packet might be generated and communicated to the media object control 114 or the media server 116 might provide the media object control 114 with an indication that the last media data associated with the desired media object has been transmitted such that the media object control initiates a disconnection.

The destination device 112 is a device to which a media object, or media session associated therewith, is transferred. As used herein, the phrase "device" refers to any electronic device capable of presenting media objects. As such, destination device 112 may take on a variety of forms, such as a personal computer (PC), a laptop computer, a mobile phone, a personal digital assistant (PDA), a portable media player (PMP), a television (TV), or any other device that is capable of presenting media objects as described herein. A portable media player (PMP) device may include, without limitation, a portable video player (PVP) and/or a digital audio player (DAP), such as a MP3 player. Accordingly, a destination device 112 that is capable of presenting media objects may be variously referred to herein as a device, a client device, a media device, a portable media device, a portable media player, a media player, and the like. Makers of illustrative devices include, for example, Research in Motion, Creative Technologies Corp., Samsung, Apple Computer, and the like. A destination device can include, for example, a display(s), a power source(s) (e.g., a battery), a data store(s), a speaker(s), memory, a buffer(s), and the like. In embodiments, a destination device comprises a wireless or mobile destination device with which a mobile data network is utilized for communication. In other embodiments, a destination device comprises a mobile or stationary source device with which a network, such as the Internet or landline is utilized for communication.

The destination device 112 might initiate a resume of delivery, reception, or presentation of a media object. In some embodiments, the destination device 112 initiates a resume by generating and/or communicating a resume request. A resume request refers to a request (e.g., a media packet) that requests or provides an indication to resume the delivery of a media object. Accordingly, the media object can be received and/or presented on a destination device at the point at which the media object was interrupted at the source device. That is, the destination device 112 initiates the resumption of delivery of a media object previously being delivered to a source device by requesting such a media object be delivered to the destination device via a streaming service. By way of example, the destination device 112 might generate and/or communicate a resume request. The resume request might include, for example, a destination device identifier, a source device identifier, a media session identifier, an indication of the last (i.e., most recent) media data received by the media object control 114 or source device 110, an indication of a point at which the media data delivery was interrupted, a resuming instruction, a media object identifier to identify the media object desired to be resumed, or the like. In one embodiment, such a resume request is communicated to the media object control 114 via network 118. For example, in instances where the destination device 112 comprises a mobile device, a resume request is communicated to the media object control 114 via a mobile data network (e.g., a 3G or 4G mobile data network). On the other hand, in instances where the destination device 112 comprises a stationary device, a resume request is communicated via a landline (e.g., cable network).

In embodiments, the destination device 112 might be configured to initiate a media object resume upon detecting an indication to initiate the resumption of a media object. In one embodiment, an indication to initiate a resumption of a media object is provided by a user. In such an embodiment, a user may navigate to a desired media object identifier or to a media session identifier. Upon navigating to the desired media object identifier or media session identifier, the user can provide an indication to initiate the resumption of the media object. For example, a user can navigate to "Video 1" and provide an indication to play "Video 1." A user-provided indication to initiate a resumption of a media object might include a user's selection of a media object identifier or media session identifier associated with the media object desired for presentation. In such a case, a user can select an identifier by, for example, double-clicking on an identifier, right-clicking on an identifier, hovering over an identifier, dragging and dropping an identifier, providing an audio command, selecting an identifier via a touch screen, or the like. A media object identifier or a media session identifier might become available as an option to a user upon a connection being established between the destination device and the media object control (e.g., either an initial connection or an establishment of a media session).

The destination device 112 might be configured to detect an indication to resume a media object upon attaining a certain threshold and/or parameter. For example, assume that hovering over a media identifier provides an indication to initiate the resumption of a media object. In such a case, the destination device 112 can detect the indication after a media object identifier is hovered over, for example, for two seconds. Such thresholds and parameters might provide a more user-friendly user interface.

In an alternative embodiment, an indication to initiate the resumption of a media object may be automatically provided. In such an embodiment, an indication to initiate the resumption of a media object may be automatically provided based on the occurrence of an event. Such an event may include, for example, initiating a media player or a media browser, navigating to a website, or the like.

The destination device 112 receives communications, for example, from the media object control 114, the media server 116, or a combination thereof. Such communications include, for example, a resume response and media data. A resume response, as used herein, refers to a packet communicated in response to a resume request that indicates a receipt or confirmation of the resume request. The media data enables the presentation of a media object on the destination device 112. In embodiments, the media data received by a destination device 112 might be stored (e.g., temporarily or momentarily) in a buffer or memory of the destination device 112.

The destination device 112 might establish a media session with a media object control, such as media object control 114. In embodiments, the destination device 112 establishes a media session with the media object control upon communicating a resume request. Establishing a media session with a media object control enables the resumption of the same media object, or media session associated therewith, previously delivered, in part, to a source device. To establish a media session with a media object control, the media object control might communicate a media session identifier to the destination device. Such a media session identifier might be the media session identifier used in association with the source device and might be stored in the media object control, a source device, and/or a media server. Alternatively, in one implementation, the media session established between a destination device and a media object control might be a distinct and separate media session from a media session established with a source device. In such a case, the media object control might associate the media sessions such that a proper transfer of a media object can occur. As can be appreciated, a media session might be established any number of ways.

The destination device 112 presents or outputs (e.g. audio or video playback) the media object, or portions thereof. In some embodiments, the destination device 112 utilizes a display screen associated with (e.g., coupled with) the destination device, an audio system associated with the destination device, or a combination thereof. The media object might be presented as the media data is received or upon the device receiving a particular amount of media data buffered on the device.

The destination device 112 disconnects or initiates a disconnection of the destination device 112 from the media object control 114 and/or the media server 116. Such a disconnection refers to ending or closing a media session, a delivery of a media object, or a combination thereof. To disconnect the destination device 112, the destination device 112 might generate and/or communicate a disconnection packet that indicates a disconnection or a request to end a media session. In some cases, a disconnection packet might be generated and communicated upon detecting a user indication that indicates a desire to end a media session. For example, in instances where a user interface is provided to a user to enable the resumption of a media object, rather than selecting to resume the media object, a user might select to discontinue the reception of media data. Alternatively, in some cases, a disconnection packet might be generated and communicated automatically upon the occurrence of an event, such as reception of a last packet associated with a media object or a media session, or a lapse of a time or time period (e.g., a disconnection occurs upon expiration of a specific amount of time). For example, assume a destination device 112 is configured to disconnect after the device has been paused for twenty-four hours. In such a case, upon the lapse of the twenty-four hour period, a disconnection packet might be automatically (i.e., without user intervention) generated and communicated to the media object control 114.

Figure 2:
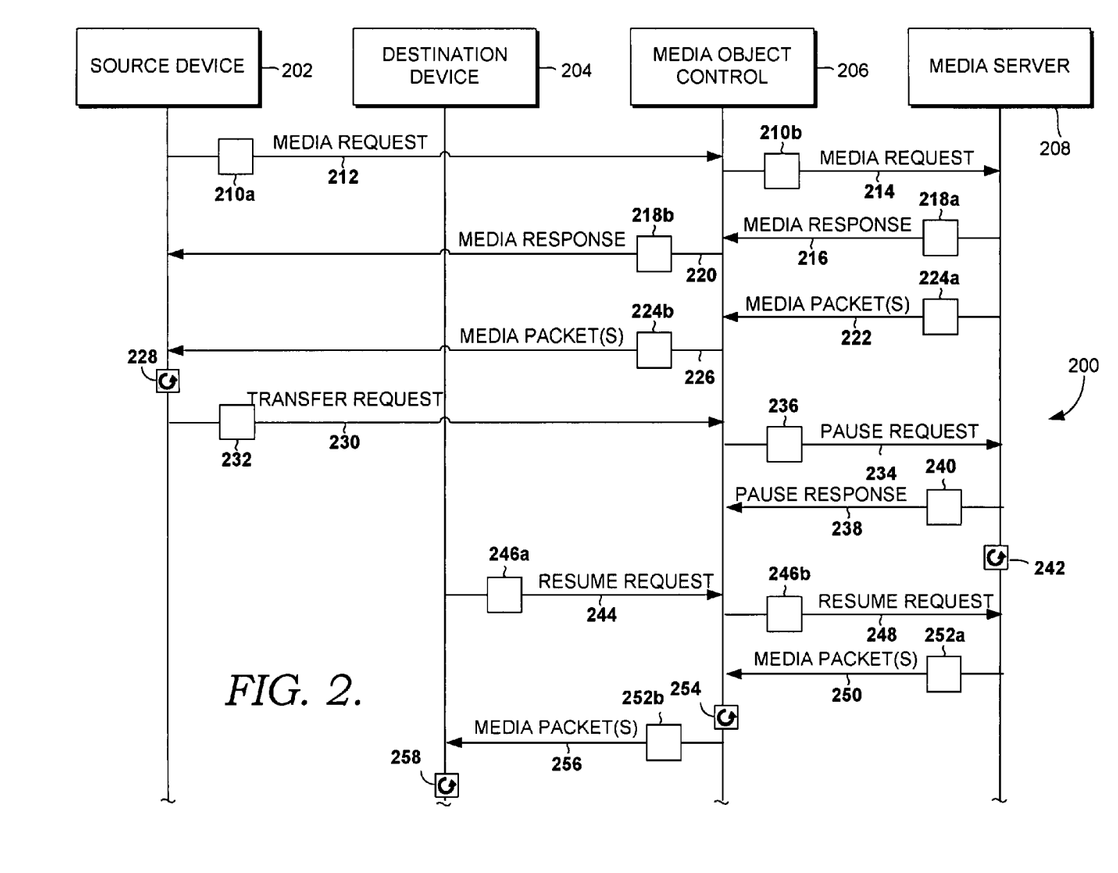
FIG. 2 depicts a flow diagram for transferring a media object from a source device to a destination device, in accordance with an embodiment of the present invention.
Figure 3:
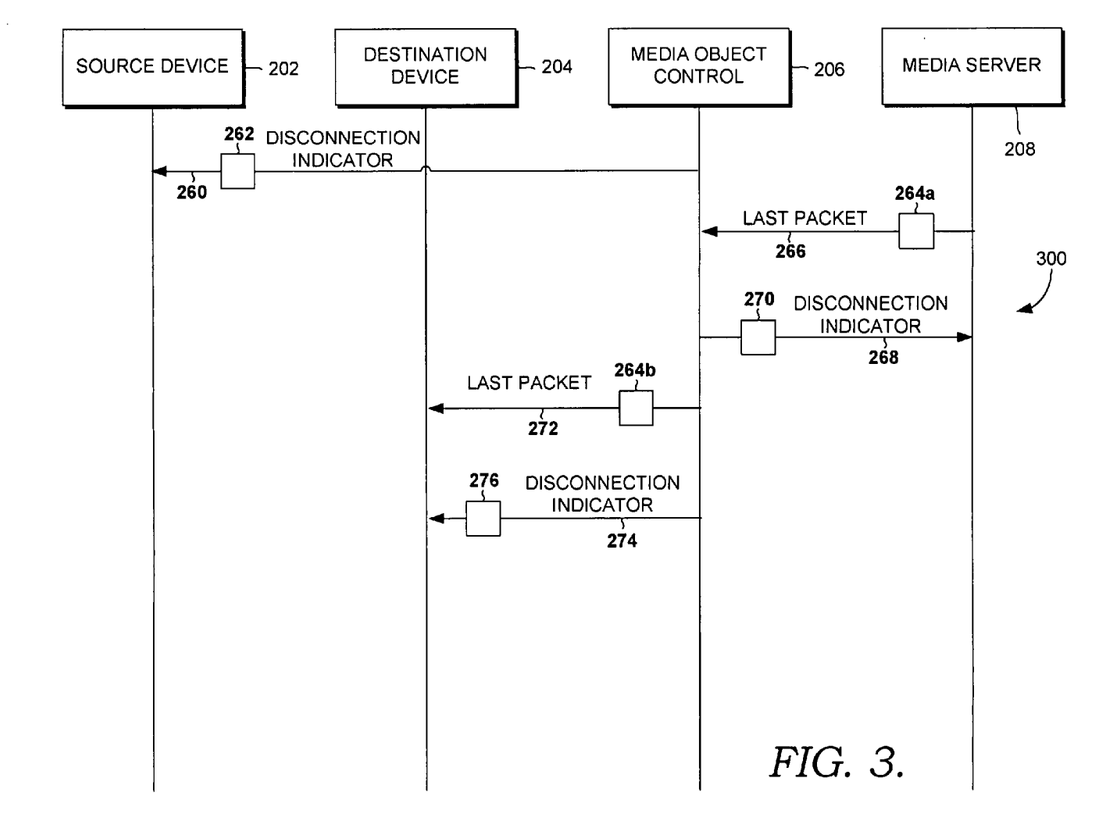
FIG. 3, a continuation of FIG. 2, depicts a flow diagram for transferring a media object from a source device to a destination device, in accordance with an embodiment of the present invention.

By way of example only, and with reference to FIGS. 2 and 3, an exemplary flow diagram illustrating a method for transferring a media object is generally depicted by numeral 200. The flow diagram includes a source device, generally depicted by numeral 202; a destination device, generally depicted by numeral 204; a media object control, generally depicted by numeral 206; and a media server, generally depicted by numeral 208. The devices and components depicted within flow diagram 200 are comparable to the devices and components of similar name previously discussed with reference to FIG. 1.

Initially, a media request 210a is communicated 212 from a source device 202 to a media object control 206. The media request includes a request for delivery, receipt, or presentation of a media object. Such a media request might be generated by the source device upon a user providing an indication of a desire to view a media object. Upon receipt of media request 210a, media object control 206 communicates 214 media request 210b to a media server 208. In response, the media server 208 communicates 216 a media response 218a to media object control 206, which, in turn, communicates 220 media response 218b to source device 202.

After the media server 208 receives the media request 210b, the media server 208 communicates 222 one or more media packets 224a having media data associated with the requested media object to the media object control 206. The media object control 206 communicates 226 one or more media packets 224b containing media data associated with the media object to the source device 202 requesting the media object. The media object control 206 begins presenting 228 a portion of the media object in connection with receiving at least a portion of the media packets 224b.

The source device 202 communicates 230 a transfer request 232 to the media object control 206. The transfer request initiates a transfer of the media object. Such a transfer request might be generated and/or communicated in response to a user indication to transfer the media object. The media object control 206 communicates 234 a pause request 236 to the media server 208. The pause request provides an indication to pause delivery of media data associated with the media object. In one embodiment, the media object control 206 forwards on the transfer request as a pause request. In an alternative embodiment, the media object control 206 generates a pause request in response to receiving the transfer request. Upon receiving the pause request 236, the media server 208 communicates 238 a pause response 240 to the media object control 206. The media object control 206 might a media session identifier in association with the source device 202. Such a media session identifier can be utilized to transfer the media object to the destination device. Upon receiving the pause request 236, the media server 208 pauses 242 delivery of media data associated with the media object.

The destination device 204 communicates 244 a resume request 246a to the media object control 206. Such a resume request is used to resume delivery of a media object from the media server 208. Such a resume request might be generated and/or communicated by the source device 202 based on a user indication to resume presentation of the media object on the destination device. A user might provide an indication by selecting the media object or the media session associated therewith via a user interface provided on the destination device 204. Upon receiving the resume request 246a, the media object control 206 communicates 248 a resume request 246b to the media server 208. Accordingly, the media server 208 resumes delivery of the media object by communicating 250 one or more media packets 252a that correspond with the requested media object. In embodiments, the first media packet of the one or more media packets 252a communicated to the media object control 206 corresponds with the last delivered or presented media packet prior to pausing the media object.

Upon receiving the media packet(s) 252a, the media object control 206 recognizes 254 that media data associated with a media object should be directed to the destination device 204 in accordance with the transfer request and/or the resume request. The media object control 206 can establish a media session with the destination device 204 so that presentation of the media object can be resumed on the destination device 204. Such a media session established with the destination device might utilize the media session identifier previously generated to continue the media session with respect to the destination device 204. As can be appreciated, establishing a media session with the destination device 204 might occur at any time, such as, for example, upon receiving a resume request, upon recognizing that media data should be directed to the destination device, etc.

Upon recognizing that the media object should be directed to the destination device 204, the media object control 206 communicates 256 one or more media packets 252b having media data associated with the resumed media object to the destination device 204. The destination device 204 can then begin presenting 258 the media object via the destination device 204. The destination device 204 can present the media object at the location of the media object at which it was disrupted at the source device 202 in accordance with an intent to transfer the media object.

Turning now to FIG. 3, a continuation of FIG. 2, that depicts an exemplary flow diagram for transferring a media object is generally depicted by numeral 300. The flow diagram includes the source device 202, the destination device 204, the media object control 206, and the media server 208 previously discussed with reference to FIG. 2. Upon transferring the media object to the destination device, the media object control 206 can provide 260 a disconnect indicator 262 to the source device 202 to disconnect or initiate a disconnection between the two components.

Assume that a last media packet 264a having media data associated with the media object is communicated 266 from the media server 208 to the media object control 206. In such a case, the media object control 206 provides 268 a disconnection indicator 270 to the media server 208 to disconnect or initiate a disconnection between the two components. The media object control 206 also communicates 272 the last media packet 264b to the destination device 204 and provides 274 a disconnection indicator 276 to the destination device 204.

Figure 4:
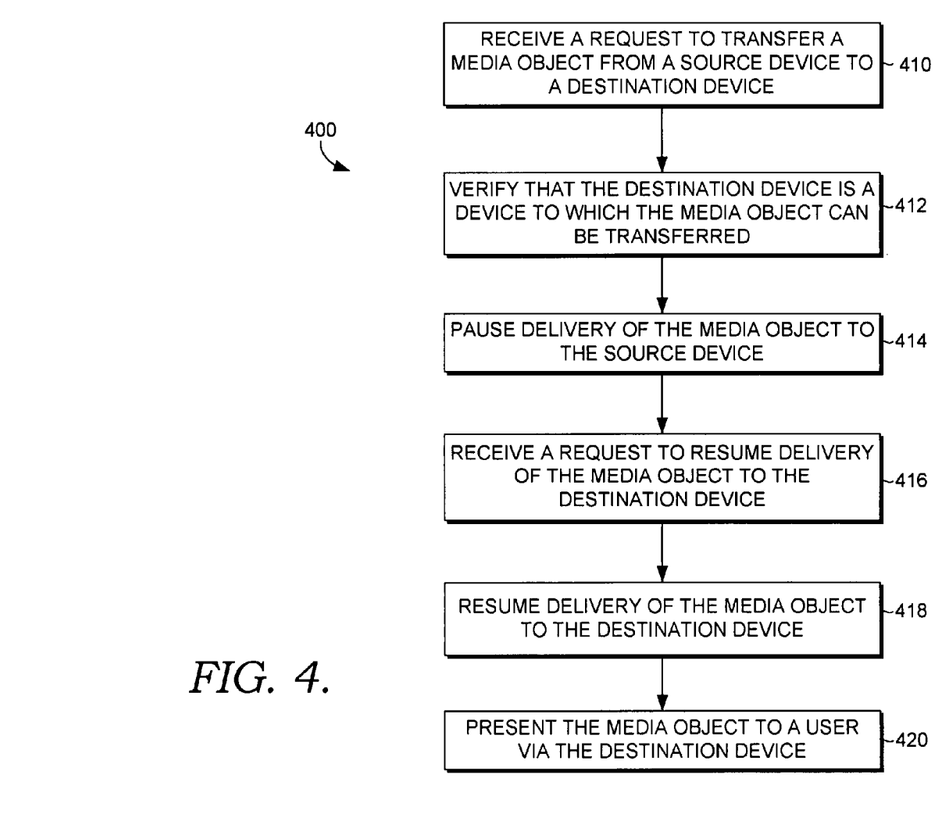
FIG. 4 illustrates a first method, according to an embodiment of the present invention, for transferring a media object from a source device to a destination device.

Referring now to FIG. 4, an exemplary method 400 for transferring a media object from a source device to a destination device is provided. Initially, as indicated at block 410, a transfer request is received from a source device. The transfer request provides a request to transfer a media object that is being delivered to the source device to a destination device. Such a transfer request might include, for example, an indication of the destination device to which the media source is to transfer. Thereafter, at block 412, it is verified that the destination device is a device to which the media object can be transferred. Delivery of the media object to the source device is paused. This is indicated at block 414. In embodiments, delivery is paused by communicating a pause request to a media server that is providing the media object via a streaming service. A resume request to resume delivery of the media object to the destination device is received at block 416. Such a resume request can be provided from the destination device in response to a user-provided indication to resume presentation and/or delivery of the media object. In embodiments, the media object is resumed by communicating a resume request to the media server that is provided the media object via a streaming service. Upon receiving the resume request, delivery of the media object is resumed such that the destination device receives the media object, as indicated at block 418. The media object received from the media server is redirected to the destination device. In embodiments, a media session can be established with the destination device, for example, in order to resume the same media session utilized by the source device. At block 420, the destination device presents the media object to a user.

Figure 5:
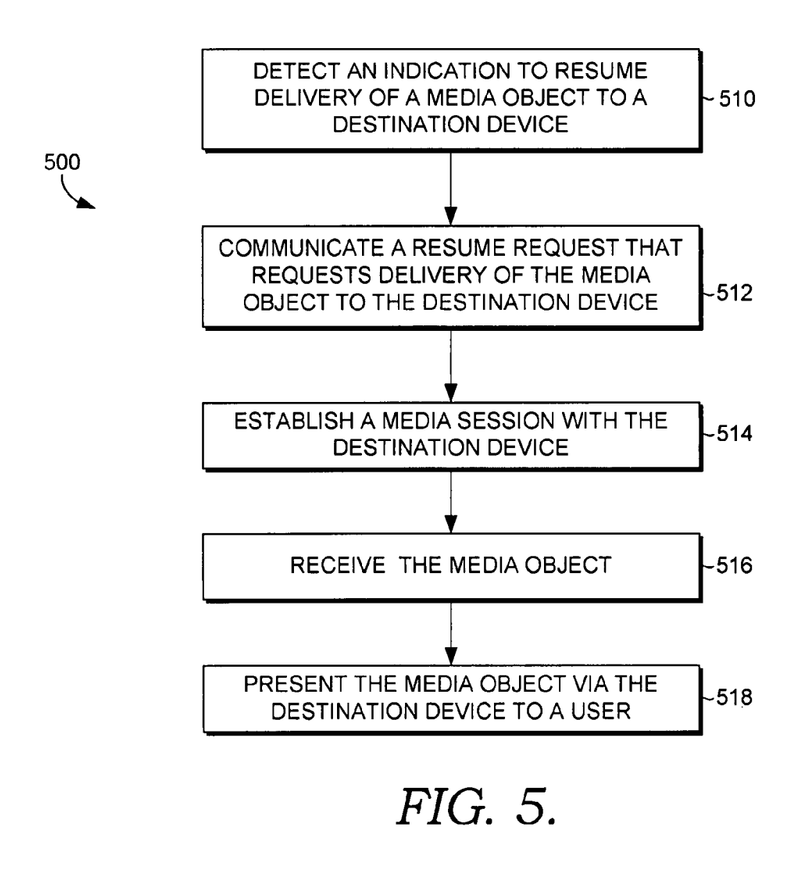
FIG. 5 illustrates a second method for transferring a media object from a source device to a destination device, in accordance with an embodiment of the present invention.

With reference to FIG. 5, in accordance with an embodiment of the present invention, an exemplary method 500 for transferring a media object from a source device to a destination device is illustrated. Initially, as indicated at block 510, an indication to resume delivery of a media object to a destination device is detected. Such an indication might be provided by a user via a user interface presented on the destination device. Accordingly, a user might select a media object identifier or a media session identifier to initiate resumption of the media object. Thereafter, at block 512, a resume request that requests delivery of the media object to the destination device is communicated. A resume request might include, for example, a destination device identifier, a media object identifier, a media session identifier, or the like. The resume request can be communicated to a media object control that communicates with a media server providing the media object. At block 514, a media session is established with the destination device. The media session is utilized to deliver the media object to the destination device. In one embodiment, the media session corresponds with the media session established with the source device. The destination device receives the media object beginning with the portion that is resumed. This is indicated at block 516. At block 518, the media object is presented via the destination device to a user.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method for transferring media objects, the method comprising:
    recognizing, at a media object control, an indication to transfer a media object being presented on a first device from the first device to a second device, the media object control being remote from the first device, the second device, and a media server;
    discontinuing delivery of the media object from the media object control to the first device, the media object being delivered via streaming services from the media server that is remote from the media object control;
    receiving, at the media object control, from the second device, an indication to resume delivery of the media object to the second device;
    resuming delivery of the media object from the media object control to the second device at about the point the delivery of the media object to the first device was discontinued for presentation of the media object on the second device, wherein the media object is received at the media object control from the media server upon the media object control providing an indication to the media server to resume delivery of the media object based on the receiving, at the media object control, from the second device, the indication to resume delivery of the media object to the second device; and
    detecting a user preference to resume the presentation of the media object on the second device, wherein the user preference is indicated via a user's selection of a media session identifier that identifies the media session or a media object identifier that identifies the media object, the media session identifier or the media object identifier being presented via a user interface of the second device.

2. The one or more computer-readable media of claim 1, wherein the media object comprises an audio media object, a video media object, or a combination thereof.

3. The one or more computer-readable media of claim 1, wherein the indication to transfer the media object from the first device to the second device is recognized based on a transfer request received from the first device.

4. The one or more computer-readable media of claim 1 further comprising communicating a pause request to the media server, the pause request providing an indication to pause delivery of the media object.

5. The one or more computer-readable media of claim 1 further comprising verifying that the second device is a registered device to which the media object can be transferred.

6. The one or more computer-readable media of claim 1 further comprising establishing a media session with the second device to enable the transfer of the media object.

7. The one or more computer-readable media of claim 1, wherein the indication to resume delivery of the media object is a resume request that specifies the media object.

8. The one or more computer-readable media of claim 1 further comprising communicating a resume request to the media server, the resume request providing an indication to resume delivery of the media object.

9. One or more non-transitory computer-readable media having computer-executable instructions embodied thereon that, when executed, perform a method for transferring media objects from source devices to destination devices, the method comprising:
    providing to a media object control, from a destination device, an indication to resume delivery of a media object to the destination device, wherein a first portion of the media object has been delivered to a source device via a streaming server and displayed prior to pausing the delivery and the presentation of the media object on the source device;
    establishing a media session that is utilized for delivering a second portion of the media object from the media object control to the destination device, the media object control being separate from the destination device and a media server providing the media object via a streaming service to the media object control;
    receiving at the destination device the second portion of the media object, the second portion of the media object being communicated from the media object control to the destination device, wherein the second portion of the media object is received at the media object control from the media server upon the media object control providing an indication to the media server to resume delivery of the media object based on the providing to the media object control, from the destination device, the indication to resume delivery of the media object to the destination device;
    presenting the second portion of the media object to a user via the destination device; and
    detecting a user preference to resume the presentation of the media object on the destination device, wherein the user preference is indicated via a user's selection of a media session identifier that identifies the media session or a media object identifier that identifies the media object, the media session identifier or the media object identifier being presented via a user interface of the destination device.

10. The one or more computer-readable media of claim 9, wherein the media object comprises a video media object, an audio media object, or a combination thereof.

11. The one or more computer-readable media of claim 9, wherein the indication to resume delivery of the media object to the destination device is provided via a resume request.

12. The one or more computer-readable media of claim 11, wherein the resume request includes a media session identifier that identifies the media session, a media object identifier that identifies the media object, or a combination thereof.

13. The one or more computer-readable media of claim 9, wherein the media session established with the destination device corresponds with a media session established with the source device.

14. The one or more computer-readable media of claim 9, wherein the second portion of the media object is delivered from a media server via a media object control.

15. The one or more computer-readable media of claim 9, wherein the second portion of the media object is presented at the point the presentation of the media object was paused on the source device.

16. One or more non-transitory computer-readable media having computer-executable instructions embodied thereon that, when executed, perform a method for transferring a media object from a source device to a destination device, wherein a portion of the media object has been delivered to the source device, the method comprising:
- receiving a request to transfer a media object from a source device to a destination device, the request to transfer the media object including an indication of the destination device to which the media source is to transfer, wherein the request to transfer the media object is received at the media object control from the source device, wherein the source device is configured for presenting at least a portion of the media object;
- verifying that the destination device is a device to which the media object can be transferred;
- pausing delivery of the media object to the source device by communicating from the media object control to a media server a request to pause delivery of the media object, the media server providing the media object to the media object control via streaming services;
- receiving at the media object control, from the destination device, an indication to resume delivery of the media object;
- based on the receiving at the media object control, from the destination device, the indication to resume delivery of the media object, resuming delivery of the media object to the destination device by communicating from the media object control to the media server a request to resume delivery of the media object;
- redirecting the media object received at the media object control from the media server to the destination device that is separate from the source device, wherein the destination device presents the media object to a user; and
- detecting a user preference to resume the presentation of the media object on the destination device, wherein the user preference is indicated via a user's selection of a media session identifier that identifies the media session or a media object identifier that identifies the media object, the media session identifier or the media object identifier being presented via a user interface of the destination device.

17. The one or more computer-readable media of claim 16 further comprising establishing a media session with the source device.

18. The one or more computer-readable media of claim 17, wherein the media session established with the source device is utilized to deliver the media object to the destination device.

* * * * *